Aug. 17, 1943.   H. C. DANN   2,327,096
TOILET ACCESSORIES
Filed Oct. 29, 1941
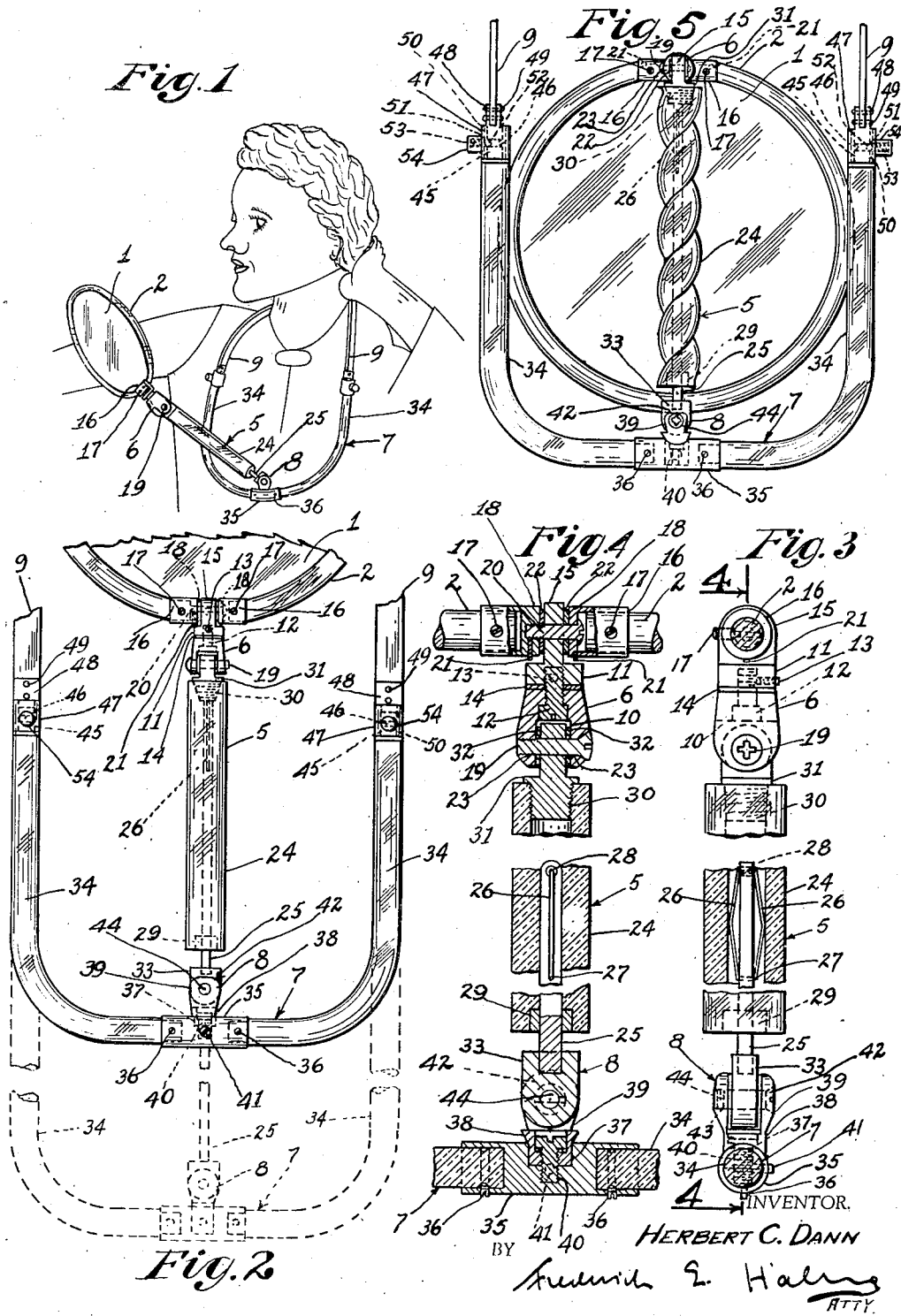
INVENTOR.
HERBERT C. DANN Patented Aug. 17, 1943

2,327,096

UNITED STATES PATENT OFFICE 2,327,096

TOILET ACCESSORY

Herbert C. Dann, New York, N. Y., assignor to Crystal Plastic Corporation, New York, N. Y., a corporation of New York Application October 29, 1941, Serial No. 416,959

4 Claims. (Cl. 88—101)

My invention relates to improvements in toilet accessories particularly in portable mirrors.

One object of my invention is a portable mirror which permits direct viewing and indirect viewing while at the same time leaving both hands free to adjust makeup, to comb, etc. I accomplish this by providing a mirror with a standard and means for hanging the mirror on the neck, on the shoulders or any other suitable part of the body, thus enabling the user to move around and to find the most satisfactory illumination either for direct viewing or for indirect viewing by turning the back to a second mirror to see the back of the head, while both hands are free.

Another object of my invention is to provide means by which the position of the mirror relative to the user can be adjusted in order to permit the user to bring the mirror into its most convenient position. I accomplish this by providing joints and hinges which permit angular and rotating movements of the mirror relative to a base element.

Another object of my invention is to provide means by which a mirror can be used either as a stand mirror to be placed on a table or as a portable mirror to be carried on the body of the wearer.

Another object of my invention is to provide means by which the mirror can be detached from its base and be used as a hand mirror.

Another object of my invention is to provide means by which the mirror, its standard and its base element can be folded into a compact convenient unit.

Other objects and advantages of my invention will be hereinafter set forth and the novel features thereof defined by the appended claims.

In the accompanying drawing an embodiment of my invention is shown.

Fig. 1 shows how a portable mirror according to my invention can be hung around the neck of a wearer.

Fig. 2 is a side view of a portable mirror according to my invention, the mirror itself being partly broken away.

Fig. 3 is a cross-section of part of the mirror on an enlarged scale.

Fig. 4 is a longitudinal section along line 4—4 of Fig. 3.

Fig. 5 is a plan view of the portable mirror after being folded into a compact unit.

1 is a mirror having two reflecting surfaces, one being preferably a magnifying one. The mirror is framed by a frame 2. Frame 2 is connected with a standard 5 by means of a joint element 6. Standard 5 is attached to a base element 7 by means of a second joint element 8. Frame 2, standard 5 and base element 7 can be made of any suitable material preferably of transparent material for instance as known under the trade name "Lucite." A strap 9 for instance of simulated leather can be connected with base element 7. This strap forms a loop which serves to hang the portable mirror around the neck of a wearer as shown in Fig. 1.

Joint element 6 permits an angular movement of mirror 1 and its frame 2 relative to the joint element and an angular movement of the standard 5 relative to the joint element. Furthermore, joint element 6 permits a rotating movement of the mirror relative to standard 5 and base element 7. Joint element 6 comprises two sections 10 and 11. Both sections are connected by a screw 12 which fits into a recess of section 10. Screw 12 is secured in its position by a set-screw 13. Screw 12 permits rotation of one section relative to the other. A washer 14 can be placed between the two sections in order to tighten the connection. Section 11 is provided with a flange 15 which engages a recess of frame 2. Over both ends of frame 2 sleeves 16 are slipped made of any suitable material for instance, metal. Sleeves 16 are secured in their positions by screws 17 which are screwed into frame 2. The ends of sleeves 16 protrude over the ends of frame 2. At the open ends of sleeves 16, discs 18 are provided. Through holes in discs 18 and an aligned hole in flange 15 a screw-bolt 20 is passed which serves as a pivot for joint element 6. Washers 22 may be provided between flange 15 and discs 18 in order to tighten an angular movement of the mirror and its frame relative to joint element 6. This has the advantage that the mirror remains in any position relative to the standard in which it has been brought. Stop-pins 21 limit the angular movements of the mirror and secure bolt 20 in its position.

Section 10 of the joint element is bifurcated at its lower end. Each prong is provided with a hole 23. The fork serves to connect standard 5 pivotally with joint element 6 in a manner hereinafter described.

Standard 5 comprises two telescoped sections 24 and 25 in order to adjust its length. Outer section 24 which may consist of transparent material as previously mentioned can be twisted as indicated in Fig. 5. Inner section 25 may be made of metal or any other suitable material. It may have a square or a circular section. In order to arrest section 25 in any intended position relative to section 24, springs 26 may be provided. The lower ends of springs 26 are attached to section 25 at points 27 and the upper ends which are preferably bent extend into a hole 28 in section 25 as shown in Fig. 3. Springs 26 will press sufficiently strong against the inner walls of the two sections to keep the sections in any adjusted relative position but will yield to any stronger pressure if a readjustment of the two sections is intended. A guiding plate 29 for section 25 is inserted at the bottom of section 24.

At the upper end of section 24 a connecting element 30 is provided which is attached to section 24 by threading or any other suitable means. Connecting element 30 carries a flange 31 having a hole. Through this hole and the aligned holes 23 in the prongs of section 10 a bolt 19 is passed which is secured in its position by being threaded into one of the prongs. This bolt bearing serves as a pivot for standard 5. Washers 32 can be provided between flange 31 and the two prongs in order to make any angular movement of the standard relative to the joint element harder, thus securing the standard in any intended position. Section 25 at its lower end carries a flange 33 which is attached to section 25 by any suitable means. Flange 33 is part of joint element 8 for the pivotable connection between standard 5 and base element 7.

Base element 7 is substantially U-shaped having two arms 34. These arms are connected by a sleeve 35 slipped over the ends of the arms. Sleeve 35 is secured in its position by means of screws 36 or any other suitable means. In the center part of sleeve 35 which is partly solid a cylindrical hole 37 is provided. In this hole is fitted the cylindrical part 38 of part 39 of joint element 8. A screw 40 which penetrates connecting element 39 secures element 39 in cylindrical hole 37 of sleeve 35 simultaneously permitting a revolving movement of connecting element 39 in the sleeve. Screw 40 is secured by a set-screw 41. At the upper end of connecting element 39 a fork 42 is provided, each prong of the fork having a hole 43. Through these holes 43 and the aligned hole in flange 33 a bolt 44 is passed having a counter-sunk head. This bolt serves as a pivot for an angular movement of the standard relative to the base element.

As it is obvious from the drawing connecting element 39 permits an angular movement of the standard relative to the base element by means of pivot 44 and a rotating movement by means of cylinder 38.

Each arm 34 ends in a part 45 having a reduced cross-section and being provided with an annular groove 46. The flexible holder 9 may consist of a strap made of simulated leather or of any other suitable material. It also may consist of chain, rope and so like. To each end of strap 9 a sleeve 47 is attached by means of a flattened section 48 and rivets or screws 49. Sleeve 47 can be lined by a bushing 50 of transparent material as used for the U-shaped base element. The walls of each sleeve and of the lining have at least one hole 51 through which a ball 52 protrudes. A spring 53 which is located in a little box 54 attached to sleeve 47 presses against ball 52.

The sleeves can be slipped over the reduced ends of the arms 34. They are secured in their position by balls 52 which enter grooves 46. The straps can be easily detached from the arms by a gentle tug.

As described in the specification and shown in the drawing the various universal joints and connecting elements enable a user of a portable mirror according to my invention to bring the mirror into any desired position and to arrest it in such position. Of particular importance is the sideway action which is indicated in Fig. 1 and which clearly gives a full view of the back of the wearer in a second mirror. Since the joint elements connecting the standard with the mirror and with the base element respectively permit not only an angular movement but also a rotating movement, full freedom of action and adjustment are secured. The washers which are inserted at various points hold the mirror in any intended position without requiring the loosening or tightening of any set-screw. The telescopic standard permits an adjustment of the mirror as to height.

A mirror according to my invention can also be used as a stand mirror. The U-shaped arms of the base element give a safe support on any desk.

If the mirror is not in use it can be folded together as shown in Fig. 5. The arms of the base element will rest at both sides of the mirror and the standard can be folded back over the mirror.

My invention is not limited to the embodiment shown and described but various alterations and changes can be made without departing from the spirit and the scope of the invention.

Having thus described my invention, what I claim is new and desire to secure by Letters Patent is:

1. A device of the character described, comprising a mirror having at least one reflecting surface, a frame for said mirror having a recess, a substantially U-shaped base element for said mirror having a similar shape and size as said mirror, a standard for said mirror, a first joint element for connecting said mirror with said standard, said joint element comprising two rotatably connected sections, a flange having an opening provided on one of said sections and engaging the recess in the frame of said mirror, a bolt passed through the opening of said flange for connecting the flange bearing section of said joint element pivotally with said frame, a forked flange provided on the other section of the joint element adapted to engage said standard, a bolt for connecting said forked section pivotally with said standard, a second joint element for connecting said base element with said standard, said second joint element comprising a forked flange for pivotally engaging said standard and a cylindrical flange for rotatably engaging said base element and a flexible holder for securing said base element to the body of the wearer detachably connected with the arms of said U-shaped base element.

2. A device of the character described according to claim 1 in which said standard consists of two telescoped sections, the outer of said sections being connected with said first joint element thus forming a handle for said mirror and the inner with said second joint element.

3. A device of the character described according to claim 1 in which a strap made of flexible material is provided at each end with sleeves adapted to be slipped over and to engage the arms of said U-shaped base element.

4. A device of the character described according to claim 1 in which a strap made of flexible material is provided at each end with sleeves adapted to be slipped over the arms of said U-shaped base element and in which spring controlled stop elements are lodged within the walls of said sleeves, said stop elements engaging said arms for securing said sleeves in their positions on said arms.

HERBERT C. DANN.